US011297620B2

(12) United States Patent
Denis et al.

(10) Patent No.: US 11,297,620 B2
(45) Date of Patent: Apr. 5, 2022

(54) JOINT BEAM SELECTION AND RESOURCE PARTITIONING IN A MM-WAVE NETWORK

(71) Applicant: COMMISSARIAT A L'ENERGIE ATOMIQUE ET AUX ENERGIES ALTERNATIVES, Paris (FR)

(72) Inventors: Benoît Denis, Grenoble (FR); Antonio De Domenico, Grenoble (FR); Gourab Ghatak, Grenoble (FR); Remun Koirala, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/120,430

(22) Filed: Dec. 14, 2020

(65) Prior Publication Data

US 2021/0195571 A1   Jun. 24, 2021

(30) Foreign Application Priority Data

Dec. 20, 2019  (EP) .................................... 19218790

(51) Int. Cl.
*H04W 16/28* (2009.01)
*H04W 72/04* (2009.01)
*G01S 11/04* (2006.01)

(52) U.S. Cl.
CPC ........... *H04W 72/046* (2013.01); *G01S 11/04* (2013.01); *H04W 16/28* (2013.01)

(58) Field of Classification Search
CPC ............... H04W 72/046; H04W 16/28; H04W 24/02; H04W 64/00; G01S 11/04
(Continued)

(56) References Cited

U.S. PATENT DOCUMENTS 9,077,649 B2 * 7/2015 Kotecha ................. H04L 47/24
2005/0070266 A1 * 3/2005 Senarath ............... H04W 16/12
455/422.1
(Continued)

FOREIGN PATENT DOCUMENTS

CN 110166100 A 8/2019

OTHER PUBLICATIONS

U.S. Appl. No. 16/681,973, filed Nov. 13, 2019, 2020/0162930 A1, Miscopein, B, et al.
(Continued)

*Primary Examiner* — Danh C Le
(74) *Attorney, Agent, or Firm* — Oblon, McClelland, Maier & Neustadt, L.L.P.

(57) ABSTRACT

A method for jointly optimizing beam selection and partitioning of transmission resources for a downlink between a base station (BS) and a user equipment (UE) in a mm-wave cellular network such as the small cell layer of a 5G network. A UE position estimate is used for accurate BS beam selection and alignment between the BS and UE beams and/or provide position-based services or functionalities. An optimal partitioning factor is obtained either by maximizing a communication performance indicator while meeting a constraint upon a localization performance indicator or by maximizing a localization performance indicator while meeting a constraint upon a communication performance indicator. A communication performance indicator can be an effective rate coverage probability or an effective throughput.

15 Claims, 6 Drawing Sheets

(58) Field of Classification Search
USPC .............................................. 370/329, 310.2
See application file for complete search history.

(56) References Cited

U.S. PATENT DOCUMENTS

| | | | |
|---|---|---|---|
| 2014/0098695 A1* | 4/2014 | Jeong .................. | H04B 7/0619 |
| | | | 370/252 |
| 2016/0043781 A1* | 2/2016 | Cho ..................... | H04B 7/0408 |
| | | | 342/373 |
| 2017/0098953 A1* | 4/2017 | Winkler .............. | H04B 7/0617 |
| 2017/0318590 A1 | 11/2017 | Byun et al. | |
| 2018/0206132 A1* | 7/2018 | Guo .................. | H04W 72/0473 |
| 2019/0228174 A1* | 7/2019 | Withrow .............. | H04L 9/3278 |
| 2019/0357260 A1* | 11/2019 | Cirik .................... | H04W 24/08 |
| 2021/0007060 A1* | 1/2021 | Chen ......................... | H04L 5/10 |
| 2021/0168841 A1* | 6/2021 | Vankayala .......... | H04W 72/048 |
| 2021/0364593 A1* | 11/2021 | Fellhauer ............. | H04B 17/309 |

OTHER PUBLICATIONS

U.S. Appl. No. 17/064,736, filed Oct. 7, 2020, De Domenico, A, et al.
U.S. Appl. No. 17/064,761, filed Oct. 7, 2020, De Domenico, A, et al.
European Search Report dated Jun. 15, 2020 in European Application 19218790.4 filed on Dec. 20, 2019, 5 pages.
Ghatak, et al., "Positioning Data-Rate Trade-off in mm-Wave Small Cells and Service Differentiation for 5G Networks", Proc. IEEE VTC Spring, XP002799154, Jun. 2018, 5 pages.
Ghatak et al., Coverage Analysis and Load Balancing in HetNets with mm-wave Multi-RAT Small Cells, IEEE Trans. on Wireless Communications, vol. 17, No. 5, May 2018, 30 pages.

* cited by examiner (a)

(b)

(a)

(b)

JOINT BEAM SELECTION AND RESOURCE PARTITIONING IN A MM-WAVE NETWORK

FIELD OF THE INVENTION

The present invention concerns the field of $5^{th}$ generation (5G) of mobile wireless networks, especially those providing location-based services or functionalities.

BACKGROUND OF THE INVENTION

The high density of small cells and the use of mm-wave bands in the new generation (5G) of mobile networks will enable to localize user equipments (UEs) with an accuracy in the sub-meter range, thus clearly outperforming the present cellular network localization capabilities. The access to high accuracy location information allows new services and functionalities to be offered such as navigation, collision-avoidance for autonomous vehicles, and traffic monitoring to name a few.

The estimation of the location information of the UEs can also be leveraged at the network side for improving beam selection and beam alignment between the UEs and their respective serving base stations, thereby enabling a more efficient use of the radio resources such as the cell effective throughput or the effective rate coverage probability as described in the paper of G. Ghatak et al. entitled "Coverage analysis and load balancing in HetNets with mm-wave multi-RAT small cells" published in IEEE Trans. on wireless communications, vol. 17, No. 5, pp. 3154-3169, May 2018.

However, when relying on the communication system itself to obtain location information of the UEs, a large overhead is required in terms of transmission resources (e.g., intervals of time, frequency etc.) which can be detrimental to the achievable data rate, latency, battery lifetime of the UEs. Conversely, if a large amount of transmission resources is allocated to data communication (and thus if a reduced amount of resources is dedicated to localization), poor localization may lead to a lower signal to noise ratio (SNR) and, hence, a poorer quality of service (QoS).

Therefore, in 5G mobile networks, a trade-off has to be achieved when allocating transmission resources to UE localization and localization-assisted communication. FIG. 1 illustrates a frame structure used in a small cell where the transmission resources (here timeslots) are partitioned between localization and localization-assisted communication.

More specifically, we assume that each frame comprises an initial access phase of length $T_I$ and a service phase of length $T_F$, the latter being divided into a data service phase of length $\beta T_F$ and a localization phase of length $(1-\beta)T_F$ where $0<\beta<1$.

The initial phase allows to determine the characteristics of a pair of Tx and Rx beams to establish a directive physical link in the mm-wave band between a UE and the SBS (Small cell Base Station) when the UE is admitted into the cell. It also generally provides an initial estimate of the position of the UE for the subsequent service phase.

The data service phase is used for localization-assisted communication of the UEs. By localization-assisted communication of a UE, we mean here a communication using a location information of the UE, e.g., for selecting the beamwidth at the SBS side and/or improving the beam alignment between the UE and the SBS.

The localization phase is dedicated to estimating and/or improving the location information of the UEs within the cell. This location information can be further used in the data service phase of the subsequent frame and/or to provide location-based service or a location-based functionality.

The impact of localization performance during localization phase upon data rate performance in the data service phase has been investigated in the paper of G. Ghatak et al. entitled "Positioning data-rate trade-off in mm-wave small cells and service differentiation for 5G networks" published in Proc. IEEE VTC Spring, June 2018.

However, no attempt has been made so far to jointly optimize beam selection and partition of transmission resources between localization and data communication. Hence, the object of present invention is to propose such a method of joint optimization, in particular fora mm-wave network.

BRIEF DESCRIPTION OF THE INVENTION

The present invention is defined by the appended independent claims. Various preferred embodiments are defined in the dependent claims.

BRIEF DESCRIPTION OF THE DRAWINGS

The present invention will be better understood from the description of the following embodiments, by way of illustration and in no way limitative thereto.

DETAILED DISCLOSURE OF PARTICULAR EMBODIMENTS

Without loss of generality, the present invention will be described within the context of a 5G network. It will nevertheless be understood by the man skilled in the art that the invention is not limited to 5G networks and even not to mm-wave networks as referred to in the introductory part. The invention will more generally apply to a localization-assisted communication between a UE and its serving base station in a cellular network. By localization-assisted communication, it is meant a communication for which the location information of the UE is used to improve the performance of the communication e.g., by selecting a beamwidth at the BS side (and possibly also at the UE side) and pointing the directions of the BS and UE beams towards each other. The location information of the UE can also be leveraged to offer location-based services or functionalities as mentioned earlier.

Typically, the 5G network comprises a layer of small cells which can communicate with the UE in the mm-wave band. It should be noted that this does not exclude a communication in another band, e.g., sub-6 GHz band or based on another technology as known in multi-RAT (Radio Access Technology) contexts.

In order to simplify the presentation, and again without loss of generality, the invention will be explained with a 1D geometric model. Such a model is appropriate in case of BSs deployed along a road for example but in general a 2D or 3D geometric model will have to be taken into account. The extension to a 2D or 3D scenario does not invalidate the following conclusions, though.

Figure 1:
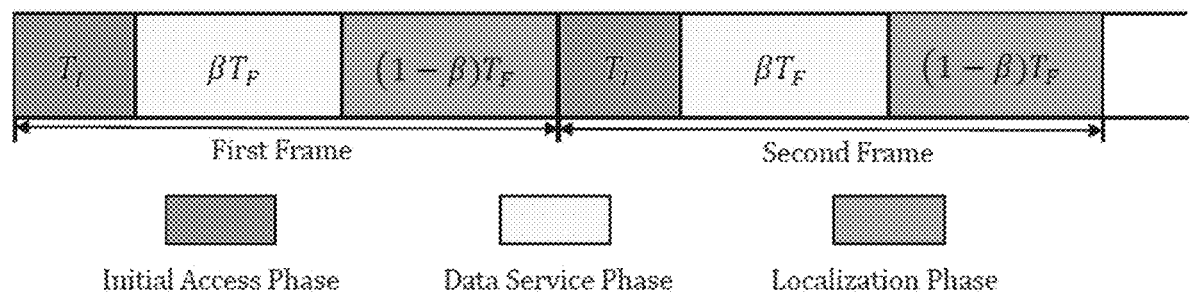
FIG. 1, already described, schematically illustrates a frame structure used for both localization and localization-assisted communication services in a mm-wave network.
Figure 2:
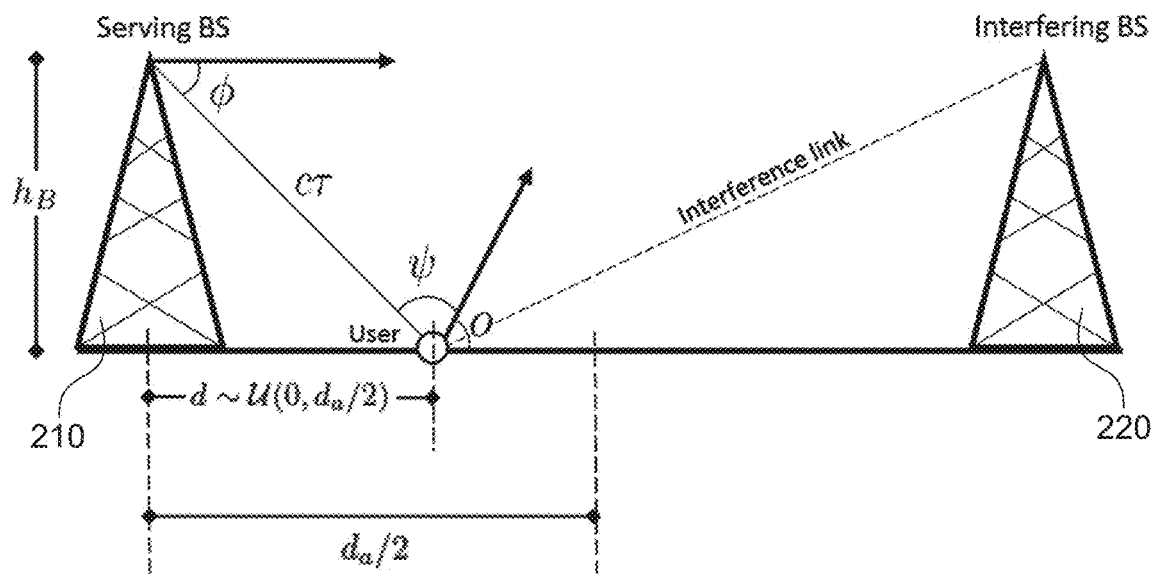
FIG. 2 schematically illustrates a geometric model showing the position of a UE in a network.

FIG. 2 schematically illustrates a 1D geometric model showing position of a UE within the cellular network.

For convenience, the BS, 210, serving the UE is assumed to be located at the origin. The UE is located at a distance d of the serving base station, where d is assumed to be a sample of a random variable U uniformly distributed over $$\left[0, \frac{d_a}{2}\right],$$

i.e., $$d \square U\left(\left[0, \frac{d_a}{2}\right]\right)$$

where $$\frac{d_a}{2}$$

is the radius of the cell, $d_a$ being the inter BS distance. In the present instance, a neighbouring interfering BS has been represented at 220.

Similarly, in case of a 2D geometric model for example, the position of the UE would be assumed to be sampled from a bidimensional random variable exhibiting a uniform distribution on a disk of radius and the position of the UE could be defined by the distance to the base station together with an angle with a line passing through BSs 210 and 220.

Turning back to the 1D model, the angle of departure of the signal transmitted by the serving BS is denoted $\phi$, whereas the angle of arrival of the signal at the UE is denoted $\psi$. In other words, $\psi$ is the angle between the pointing direction of the receiving beam and the direction of the incoming signal. In case of LOS (Line Of Sight), $\phi$ is the angle between the horizontal and the pointing direction of the transmitting beam. The angle between the receiving beam of the UE and the horizontal is denoted o.

We will also assume in the following that the serving BS is provided with a plurality of beam dictionaries $BD_k$, k=1, . . . , N. Each dictionary $BD_k$ is associated with a given beamwidth, $\theta_k$ and defines a set of beams of beamwidth $\theta_k$ and different orientations (or angles of departure), $B_{j,k}$, j=1, . . . , k Hence, each dictionary $BD_k$ can be defined as a list of pairs $(\theta_k, \phi_{j,k})$, j=1, . . . , k where $\phi_{j,k}$, j=1, . . . , k are the respective orientations of the beams. In case of the 1D model, dictionary $BD_k$ may alternatively be defined by a list of triplets $(\theta_k, d_{j,k}^L, d_{j,k}^R)$ where $d_{j,k}^L$ and $d_{j,k}^R$ respectively define the left and right boundaries of the beam coverage (beam sectorized model) on the line passing through BSs 210 and 220. In a 2D model, the beams of dictionary $BD_k$ would be defined by the beamwidth $\theta_k$, the coordinates of the centre of the beam coverage and the associated radius.

The plurality of beam dictionaries can be represented more concisely in a N×N matrix BD stacking the beam dictionaries. For example, where the triplet beam definition is adopted:

$$BD = \begin{bmatrix} (\theta_1, d_{1,1}^L, d_{1,1}^R) & - & \cdots & - \\ (\theta_2, d_{1,2}^L, d_{1,2}^R) & (\theta_2, d_{2,2}^L, d_{2,2}^R) & \cdots & - \\ \vdots & \vdots & \ddots & \vdots \\ (\theta_K, d_{1,N}^L, d_{1,N}^R) & (\theta_N, d_{2,N}^L, d_{2,N}^R) & \cdots & (\theta_K, d_{N,N}^L, d_{N,N}^R) \end{bmatrix} \quad (1)$$

Each row of matrix BD corresponds to a dictionary and each element of this row defines a beam belonging to this dictionary.

The beams of a dictionary provide a complete coverage of the cell served by the BS. Consequently, the smaller the beamwidth $\theta_k$, the higher the number N of beams in dictionary $BD_k$.

Figure 3:
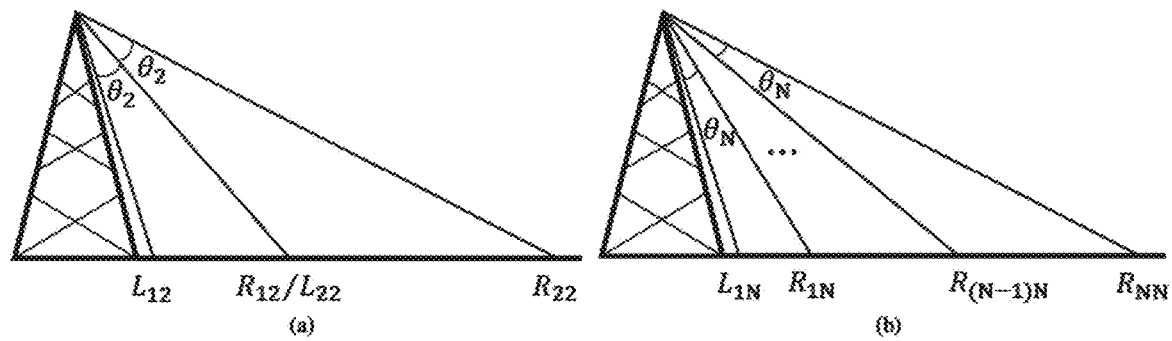
FIG. 3 schematically illustrates the coverage of a cell by beams of two beam dictionaries.

FIG. 3 shows the coverage of a cell by beams belonging to a dictionary.

For the sake of simplicity, we have only represented one side of the 1D cell model. In practice, it will be understood that the cell may have beams pointing either to positive or negative directions. The invention is not restricted to a symmetrical or unsymmetrical angular distribution of beams though.

The left part of the figure shows an example of cell coverage provided by beams belonging to $BD_2$, that is $(\theta_2, d_{1,2}^L, d_{1,2}^R)$ and $(\theta_2, d_{2,2}^L, d_{2,2}^R)$.

The right part of the figure shows an example of cell coverage provided by beams belonging to $BD_N$, that is $(\theta_N, d_{1,N}^L, d_{1,N}^R), (\theta_N, d_{2,N}^L, d_{2,N}^R), \ldots, (\theta_N, d_{N,N}^L, d_{N,N}^R)$.

The partition $\Omega_k$ of the cell induced by the beams of dictionary $BD_k$ can be expressed by a list of contiguous elementary coverage areas:

$$\Omega_k = \{[d_{j,k}^L, d_{j,k}^R]; j=1, \ldots, k\} \quad (2)$$

where $\omega_{j,k} = [d_{j,k}^L, d_{j,k}^R]$ denotes the elementary coverage area corresponding to beam $$(\theta_k, d_{j,k}^L, d_{j,k}^R), \text{ with } d_{1,k}^L = 0,$$

$$d_{k,k}^R = \frac{d_a}{2}, d_{j,k}^L = d_{j-1,k}^R; j = 2, \ldots, k.$$

Two main sources of errors may affect the choice of beam characteristics, such as beam pointing direction and beamwidth.

The first source of errors relates to beam selection at the BS side. Indeed, relying on an estimate, $\hat{d}$, of the position of the UE, the BS may select a beam of a dictionary which does not cover the UE, actually located at position d.

Figure 4A:
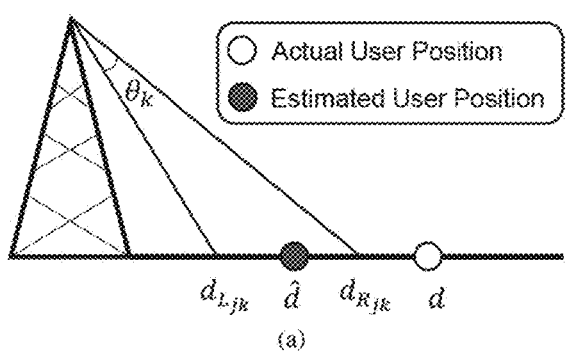
FIGS. 4A and 4B respectfully illustrate a beam selection error scenario and a beam misalignment error scenario.

FIG. 4A represents a scenario of erroneous beam selection at the BS. The UE position estimate $\hat{d}$ is found to be within $\omega_{j,k}$ whereas it actually lies outside this range.

The probability of erroneously selecting beam $B_{j,k} \in BD_k$ can be expressed as follows:

$$P_{j,k}^{BS}(\hat{d}) = P(\hat{d} \notin \omega_{j,k} | d \in \omega_{j,k}) \quad (3)$$

This probability of error depends on the position of the UE and will be therefore referred to as localization-based beam selection error. Assuming that the UE position estimate $\hat{d}$ is a Gaussian random variable centered around d and of standard deviation $\sigma_d$, the localized-based beam selection error can be obtained by:

$$P_{j,k}^{BS}(\hat{d}, \sigma_d) = P(\hat{d} < d_{j,k}^L) + P(\hat{d} > d_{j,k}^R) \quad (4)$$
$$= 1 - Q\left(\frac{d_{j,k}^L - \hat{d}}{\sigma_d}\right) + Q\left(\frac{\hat{d} - d_{j,k}^R}{\sigma_d}\right)$$

where $Q(\cdot)$ is the tail distribution function of the standard normal distribution.

The second source of errors relates to beamforming at the UE side. Indeed, relying on an estimate, $\hat{\psi}$ of the angle of arrival (AoA) of the downlink signal, the UE may form a beam which is not directed to the actual angle of arrival $\psi$.

Figure 4B:
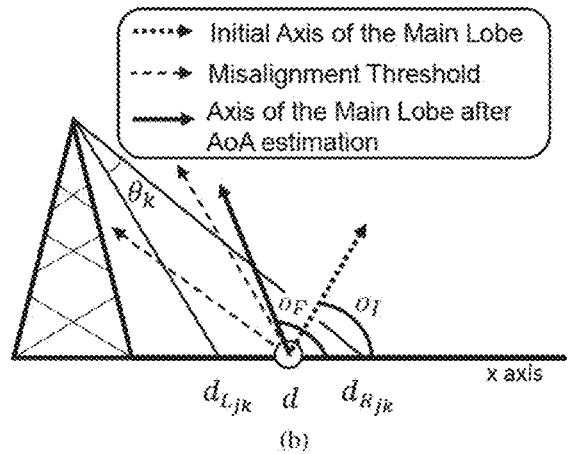

FIG. 4B represents a scenario of erroneous beamforming at the UE side. The BS has selected beam $B_{j,k}$ and the UE has oriented the main lobe of the receive beam towards direction $\hat{\psi}$ in order to align it with the main lobe of $B_{j,k}$.

The initial orientation of the UE receive beam is designated by $o_I$. After having received pilot signals from the BS, the UE estimates the AoA and forms/orientates the receive beam in direction $o_F$.

The probability of misaligning the receive beam with the main lobe of $B_{j,k}$ can be expressed as follows:

$$P_{j,k}^{MA}(\hat{d}, \hat{\psi}) = P(|\hat{\psi} - \psi| > v) \quad (5)$$

where v is an alignment threshold.

Assuming that $\hat{\psi}$ is a Gaussian random variable centered around $\psi$ and of standard deviation $\sigma_\psi$, the localized-based beam alignment error can be obtained by:

$$P_{j,k}^{MA}(\hat{d}, \hat{\psi}, \sigma_\psi) = 2Q\left(\frac{v}{\sigma_\psi}\right) \quad (6)$$

The variance $\sigma_d^2$ is lower bounded by the theoretical Cramer-Rao Lower Bound (CRLB) or the tighter Ziv-Zakai Bound (ZZB) related to any unbiased estimator of d. The standard deviation $\sigma_d$ can therefore be approximated by the square root of the CRLB or the ZZB.

Alternatively, the standard deviation $\sigma_d$ can be empirically provided by a practical estimator out of received signals and/or sequences of range measurements.

Similarly, the standard deviation $\sigma_\psi$ can be approximated by the CRLB or the ZZB related to any unbiased estimator of $\psi$, or empirically provided by a practical estimator out of received signals and/or sequences of AoA measurements.

The present invention makes use of a communication performance indicator and of a localization performance indicator, respectively concerning the data service phase and the localization phase.

The communication performance indicator indicates the quality of the downlink communication between the BS and the UE. It can be defined for example as the effective user throughput, the user SNR coverage probability or the user effective rate coverage probability. The effective user throughput is defined as the downlink data rate between the BS and the UE weighted by the probability of outage, $P_{out}$ of the downlink with respect to a predetermined SNR (or SINR) threshold. The user SNR coverage probability is defined as the probability that the SNR (or SINR) is higher than a predetermined threshold, $\gamma_0$. The user effective rate coverage probability is defined as the probability that the downlink data rate of the user is greater than a predetermined threshold, $r_0$.

In general, assuming a predetermined beamwidth $\theta_U$ at the UE side, the communication performance indicator will depend on the beam selected in the dictionary, the UE location information estimate $(\hat{d}, \hat{\psi})$, and the accuracy of the estimation $(\sigma_d, \sigma_\psi)$. It can be therefore denoted $f_{com}(j,k,\hat{d},\hat{\psi}, \sigma_d, \sigma_\psi, \beta)$ and more simply $f_{com}(k,\beta)$ in order to emphasize the dependency of the communication indicator upon the optimization parameters i.e., the beamwidth $\theta_k$ of the beam at the BS and the transmission resource partitioning factor, $\beta$.

The localization performance indicator reflects the quality of the estimation of the location information of the user. A typical localization performance indicator can be defined as the inverse product of the probability of beam selection error and the probability of misalignment of the UE beam with the BS beam:

$$f_{loc}(j,k,\hat{d},\hat{\psi},\sigma_d,\sigma_\psi,\beta) = (P_{j,k}^{BS}(\hat{d},\sigma_d,\beta) P_{j,k}^{MA}(\hat{d},\hat{\psi},\sigma_\psi, \beta))^{-1} \quad (7)$$

where, at the BS, beam $B_{j,k} \in BD_k$ of beamwidth $\theta_k$ has been selected in the beam dictionary, and where, at the UE, a beam $B_U$ has been formed in direction given by angle $\hat{\psi}$. In expression (7), the probability of beam selection error and of beam misalignment is dependent upon partitioning factor $\beta$. Indeed, the higher $\beta$, the less transmission resources can be used for localization purposes, e.g., the scarcer the pilot symbols for range and AoA estimation.

As above, the localization performance indicator will be more simply denoted $f_{loc}(k,\beta)$ in order to emphasize its dependency upon the optimization parameters, $\theta_k$ and $\beta$.

It should be noted that the lower the beam selection error probability and the lower the beam misalignment probability, the higher the location performance indicator.

The man skilled in the art will understand that alternative localization performance indicators could be envisaged. For example, the localization performance indicator can be defined as an (inverse) weighted product, a sum of logs or weighted logs, or a combination of the beam selection error probability and beam misalignment probability. In case of the localization performance indicator has to be calculated over a plurality of users, it may be computed according to a fairness criterion such as the min-max over the localization performance indicators of the UEs in question.

Similarly, alternative communication performance indicators could be envisaged. For example, in case the communication performance indicator has to be calculated over a plurality of users, it may be computed according to an average an average effective throughput, the effective throughput of a user equipment being defined as a downlink data rate between the BS and this user equipment. According to another variant, it can be computed according to a proportional fairness indicator such as the average of the logarithms of the effective throughputs of the UEs in question.

Other variants of these communication and localization performance indicators can be envisaged without falling outside the scope of the present invention.

The communication and localization performance indicators have higher values for higher performances. Alternatively, we may use inverse performance indicators. For example, an inverse localization performance indicator would be the product of the probability of BS beam selection error and the probability of misalignment of the UE and BS beams, which should thus be minimized to get a higher performance.

Figure 5:
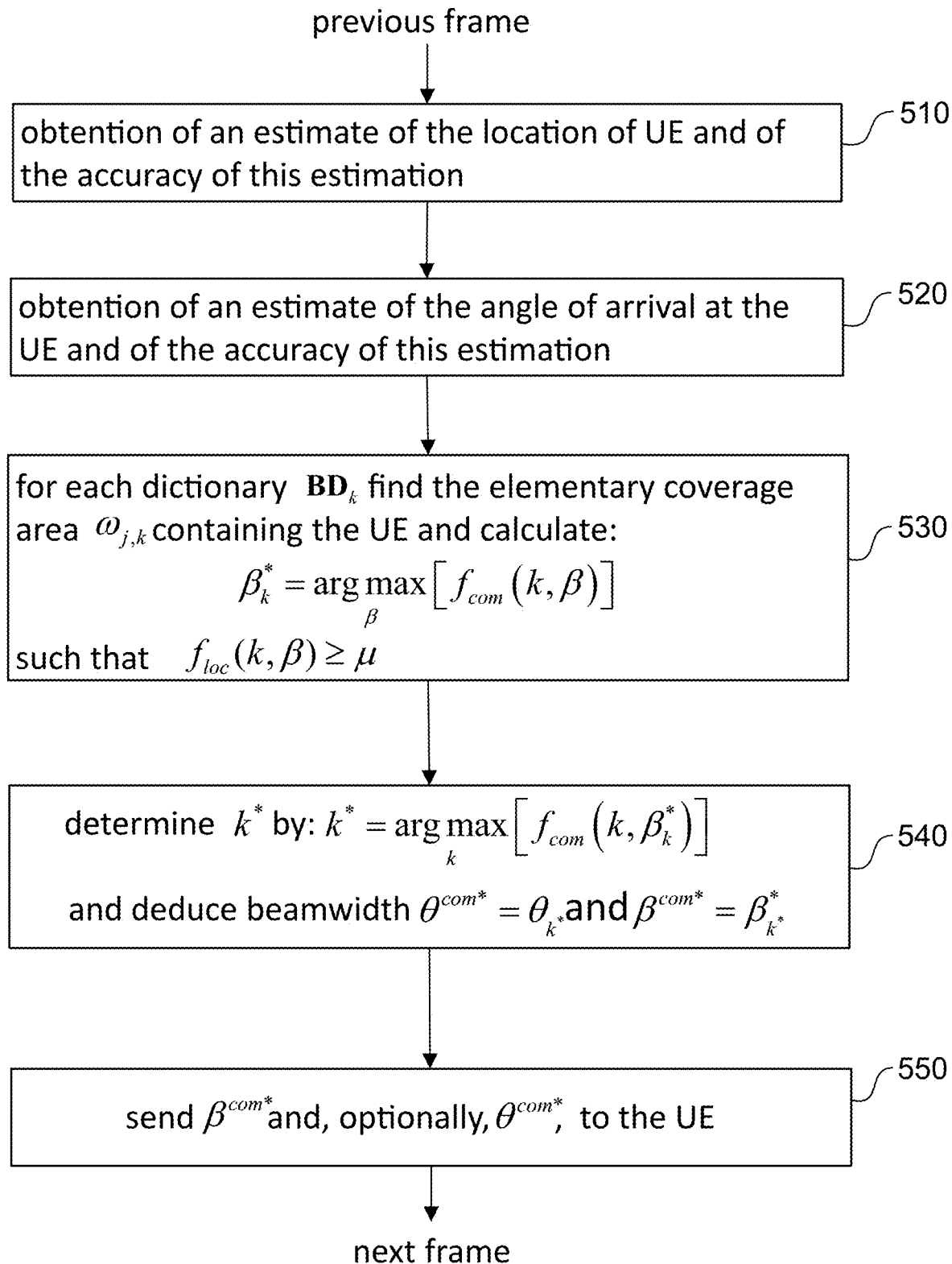
FIG. 5 represents the flowchart of a method of joint optimization of beam selection and transmission resource partitioning according to a first embodiment of the invention.

FIG. 5 represents the flowchart of a method of joint beam selection and transmission resource partitioning, according to a first embodiment of the invention.

In this embodiment, priority is given to data communication for the allocation of transmission resources.

The transmission resources can be for example time intervals in a frame structure as described above or a number of carriers in a frequency band, or a number of pilots in a time-frequency multiplexed scheme.

The joint optimization is performed in each frame during the localization phase.

At step 510, the BS obtains an estimate, $\hat{d}$, of the location of the UE. This location can be estimated at the UE from RSSI measurements of the downlink signal, the estimate being then sent to the BS. Alternatively, the location of the UE can be estimated at the BS from RSSI measurements of the uplink signal. A further option consists in performing delay estimation for both downlink and uplink received signals (resp. at UE and BS) so as to determine the round-trip time of flight.

The entity estimating the UE location also estimates the accuracy, $\sigma_d$, of the location measurement.

As mentioned earlier, the accuracy of the UE location can be approximated by a Cramer-Rao bound or a Ziv-Zakai bound.

At step 520, the UE estimates the angle of arrival (AoA), $\hat{\psi}$, from downlink pilot symbols received by a plurality of elementary antennas equipping the UE. The estimation of the AoA can be carried out at the UE and the result is then sent to the BS. Alternatively, the amplitude and phase information of the received pilot symbols can be sent to the BS for estimation of the AoA. In both cases, the entity in charge of the estimation of the AoA also estimates the accuracy, $\sigma_\psi$, of this measurement.

As mentioned earlier, the accuracy of the AoA measurement can be approximated by a Cramer-Rao bound or a Ziv-Zakai bound.

At step 530, the BS looks up into each dictionary $BD_k$, k=1, ..., N for the respective elementary areas, $\omega_{j,k}=[d_{j,k}^L,d_{j,k}^R]$, k=1, ..., N, containing the location estimate, $\hat{d}$. For each index value, k, the BS calculates the partition factor, $\beta_k^{com*}$, maximizing the communication performance indicator $f_{com}(j,k,\hat{d},\hat{\psi},\sigma_d,\sigma_\psi,\beta)$ taken as a function of $\beta$, while meeting the constraint on the localization performance constraint $f_{loc}(k,\beta) \geq \mu$ where $\mu$ is a predetermined performance threshold.

At step 540, the BS compares the values of the communication performance indicators $f_{com}(j,k,\hat{d},\hat{\psi},\sigma_d,\sigma_\psi,\beta_k^{com*})$ for the various beamwidth indices k=1, ..., N, and determines the beamwidth index, k*, corresponding to the highest value. The optimal beam at the BS is therefore the beam $B_{j,k*}$ and the optimal partition factor is $\beta_{k*}^{com*}$.

This optimal partition factor is used for partitioning the transmission resources respectively devoted to data communication and localization in the next frame. In this embodiment, it is important to note that the just enough transmission resources are allocated to satisfy a priori localization performance constraints while the rest of them is allocated for full-extent maximization of the data communication performance, e.g., for maximization of the data rate.

At step 550, the optimal partition factor, $\beta_{k*}^{com*}$, is sent to the UE. Optionally, the optimal beamwidth, $\theta_{k*}$, of the beam at the BS side is sent along with the optimal partition factor $\beta_{k*}^{com*}$ to the UE.

The above described process can be periodically repeated during the localization phase to take into account any important change in the system dynamics, such as the user position or the TX/RX beamwidth.

The joint optimization process described above is carried out at the BS. Alternatively, but less preferably, the joint optimization process can be carried out at the UE, the result of the joint optimization, namely the optimal partition factor, $\beta_{k*}^{com*}$, and the optimal beamwidth, $\theta_{k*}$, being then sent to the BS.

Alternatively, it can be carried out at a centralized controller (for example located at a macro-cell base station), the joint beam selection and partitioning of transmission resources then being obtained by marginalizing the communication and localization performance indicators over an a priori spatial distribution of the base stations and the related user equipments.

Figure 6:
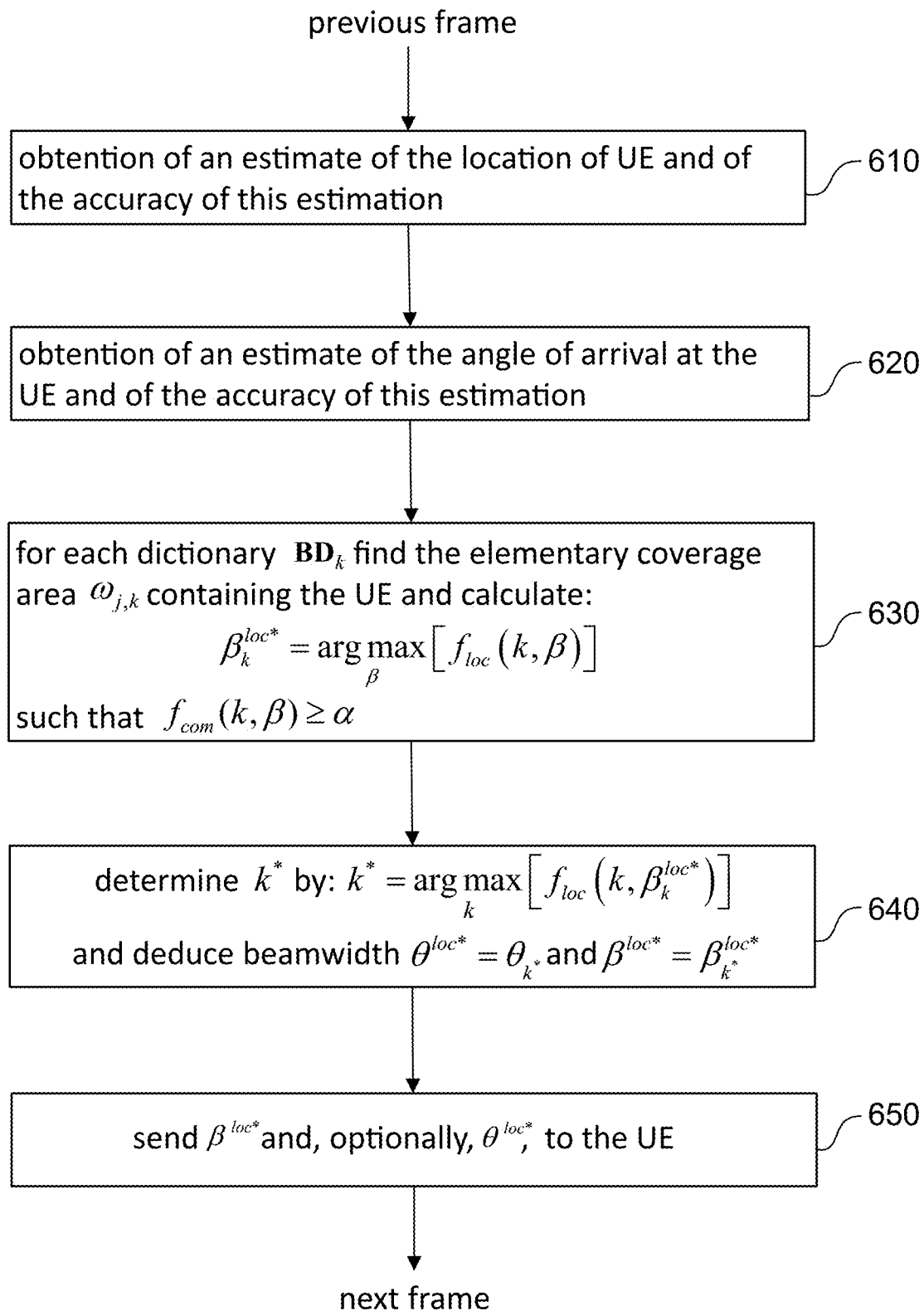
FIG. 6 represents the flowchart of a method of joint optimization of beam selection and transmission resource partitioning according to a second embodiment of the invention.

FIG. 6 represents the flowchart of a method of a method of joint beam selection and transmission resource partitioning, according to a second embodiment of the invention.

In this embodiment, priority is given to localization for the allocation of transmission resources.

Steps 610 and 620 are identical to steps 510 and 520, respectively. Hence, their description of these steps and their variants will be omitted here.

At step 630, the BS looks up into each dictionary $BD_k$, k=1, ..., N for the respective elementary areas, $\omega_{j,k}=[d_{j,k}^L,d_{j,k}^R]$, k=1, ..., N, containing the location estimate, $\hat{d}$. For each index value, k, the BS calculates the partition factor, $\beta_k^{loc*}$, maximizing the localization performance indicator, that is maximizing $f_{loc}(j,k,\hat{d},\hat{\psi},\sigma_d,\sigma_\psi,\beta)$ taken as a function of $\beta$, while meeting the constraint on the communication performance constraint $f_{com}(k,\beta) \geq \alpha$ where $\alpha$ is a predetermined performance threshold.

At step 640, the BS compares the values of the location performance indicators $f_{loc}(j,k,\hat{d},\hat{\psi},\sigma_d,\sigma_\psi,\beta_k^{loc*})$ for the various beamwidth indices k=1, ..., N, and determines the beamwidth index, k*, corresponding to the highest value. The optimal beam at the BS is therefore the beam $B_{j,k*}$ and the optimal partition factor is $\beta_{k*}^{loc*}$.

As in the first embodiment, the optimal partition factor is used for partitioning the transmission resources respectively devoted to data communication and to localization (in the next frame). In this embodiment though, just enough transmission resources are allocated to satisfy a priori communication performance constraints while the rest of them is allocated for full-extent maximization of the localization performance.

At step 650, the optimal partition factor, $\beta_{k*}^{loc*}$, is sent to the UE. Optionally, the optimal beamwidth, $\theta_{k*}$, of the beam at the BS side is sent along with the optimal partition factor $\beta_{k*}^{loc*}$ to the UE.

The above described process can be periodically repeated during the localization phase.

As in the first embodiment, the joint optimization process can alternatively, but less preferably, be carried out at the UE, the result of the joint optimization, namely the optimal partition factor, $\beta_{k*}^{com*}$ and the optimal beamwidth, $\theta_{k*}$, being then sent to the BS.

It can also be carried out at a centralized controller as mentioned above.

FIGS. 5 and 6 illustrate a joint optimization process of beam selection and transmission resource partitioning, based on UE centric performance indicators. However, the man skilled in the art will understand that these performance indicators can be averaged on all the UEs simultaneously served by the cell. The determination of the optimal partition factor, be it according to the first or the second embodiment can therefore take into account all the UEs together. This optimization process can be performed sequentially one UE after the other, or carried out in parallel for all the users. When carried out in parallel, a single global optimal partitioning factor can be determined for all the UEs of the cell served by the BS.

Figure 7:
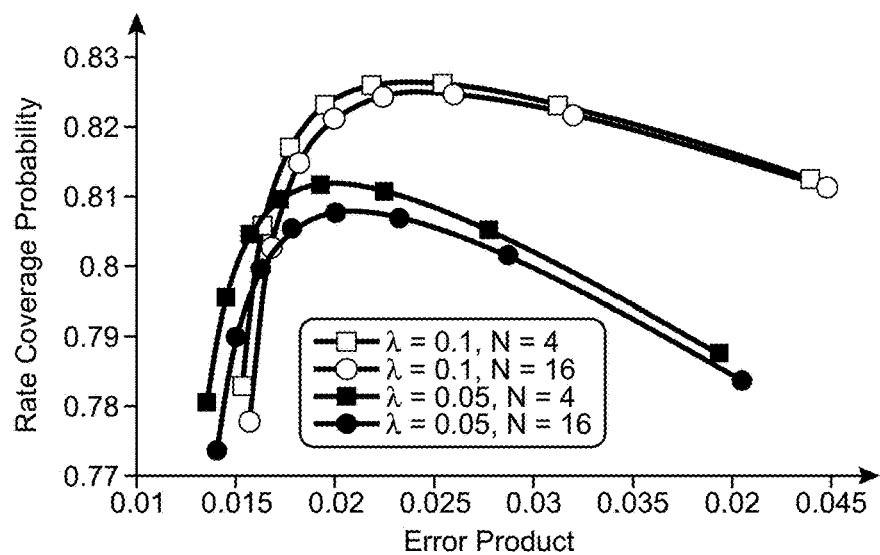
FIG. 7 represents an example of behaviour of a communication performance indicator vs. an inverse localization performance indicator for different deployment densities and beam dictionary sizes.

FIG. 7 represents an example of behaviour of a communication performance indicator vs. an inverse localization performance indicator for different deployment densities and beam dictionary sizes.

More specifically, FIG. 7 represents the effective rate coverage probability of a UE with respect to the product of the BS beam selection error and the probability of misalignment of the UE and BS beams, for different SBS deployment densities and beam dictionary sizes, i.e., different values of N.

It is noted that for different beam dictionary sizes, the effective rate coverage probability first increases with inverse localization performance (i.e. with decreasing localization performance) until it reaches a maximum and then gradually decreases. This is observed for various BS deployment densities, $\lambda$, as shown on the figure.

The figure highlights the non-trivial trade-off between localization and data rate performance: to achieve high localization performance (i.e., a low error product), sufficient transmission resources need be allocated to the localization phase, thereby enabling efficient beam selection and accurate alignment. At first, a small increase of the partition factor, $\beta$, and hence a higher error product does not result in a large deterioration of the localization performance but, in contrast, may significantly enhance the communication performance. However, further increasing partition factor $\beta$ beyond an optimal value deteriorates the communication performance. Indeed, allocating too many transmission resources to the communication phase leaves insufficient resources to the localization phase. The high beam error and poor beam alignment and therefore low SINR deteriorates the performance of the communication despite of the higher number of resources allocated thereto.

It is also important to note that, in order to achieve the optimal rate coverage, the error product is slightly larger for larger beam dictionaries. Indeed, the higher the size N of the beam dictionary, the thinner the beams and hence the larger the probability that the UE would lie outside the serving BS beam or the probability that the beams are misaligned. However, when changing the system parameters, e.g., the antenna gains, we do not have always the same trend, i.e., by increasing the size N of the beam dictionary, we may improve the rate coverage as explained further below.

Figure 8A:
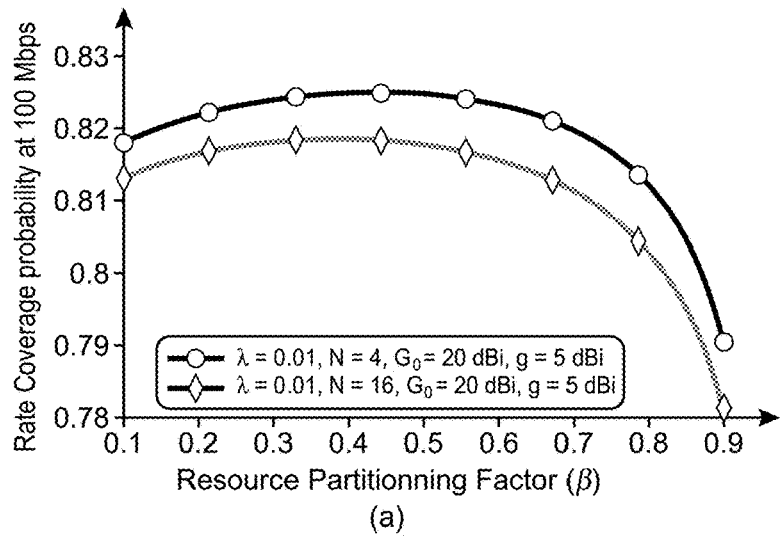
FIGS. 8A and 8B represent examples of behaviour of a communication performance indicator vs. a resource partitioning factor for different beam dictionary sizes.
Figure 8B:
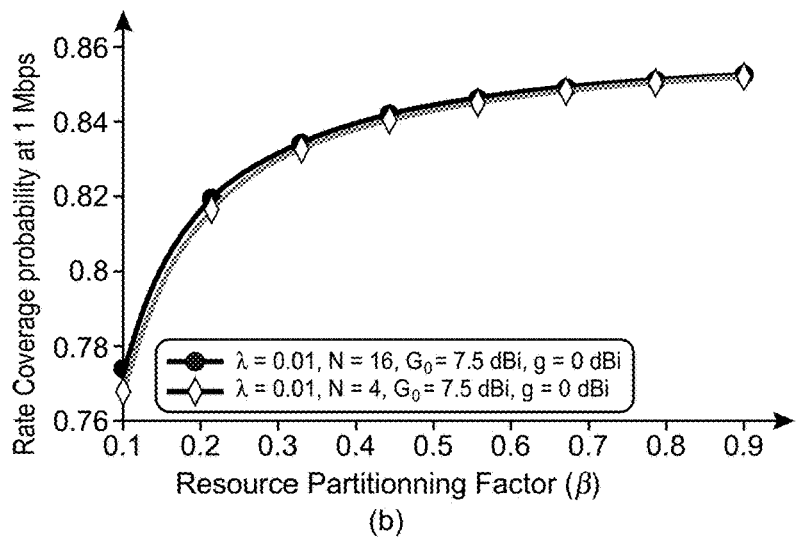

FIGS. 8A and 8B represent examples of behaviour of a communication performance indicator vs. a resource partitioning factor for different beam dictionary sizes.

More specifically, FIGS. 8A and 8B represent the rate coverage probability for a downlink at 100 Mbps and 1 Mbs, respectively. The behaviour of the rate coverage is given for various BS antenna gains $G_0$, g and dictionary sizes, N. $G_0$ stands for the gain of the main lobe in the pointing direction (i.e., the maximum value of the gain of the antenna) of the BS beam and g for the gain of its highest side lobe.

First, it should be noted that there exists an optimum value, $\beta_{k^*}^{com*}$, of the partitioning factor for each dictionary size for which the rate coverage probability is maximized. The optimum value $\beta_{k^*}^{com*}$ not only depends upon the dictionary size but also on the system parameters such as the antenna gains. From FIG. 8A, it can be seen that optimum value $\beta_{k^*}^{com*}$ decreases with the dictionary size. Indeed, the thinner the beamwidth, the more transmission resources have to be allocated to localization in order to cap the probability that the UE lies outside the coverage of the serving beam.

Second, the behavior of the rate coverage vs. the partitioning factor differs when the antenna gain, $G_0$, is low or high. When the antenna gain is low, the rate coverage increases with the partitioning factor whereas, when the antenna gain is high, the rate coverage increases until it reaches a maximum and sharply decreases. This can be explained by the fact that at low gain the selection error and the beam misalignment (large main lobe) play little role in the communication performance, the latter essentially depending upon the allocation of resources to transmission. Moreover, in the instance of low antenna gains, for a given deployment density, a beam dictionary of larger size, corresponding to a smaller beamwidth, leads to a slightly higher rate coverage probability because of the higher radiated power and hence higher SINR.

Figure 9A:
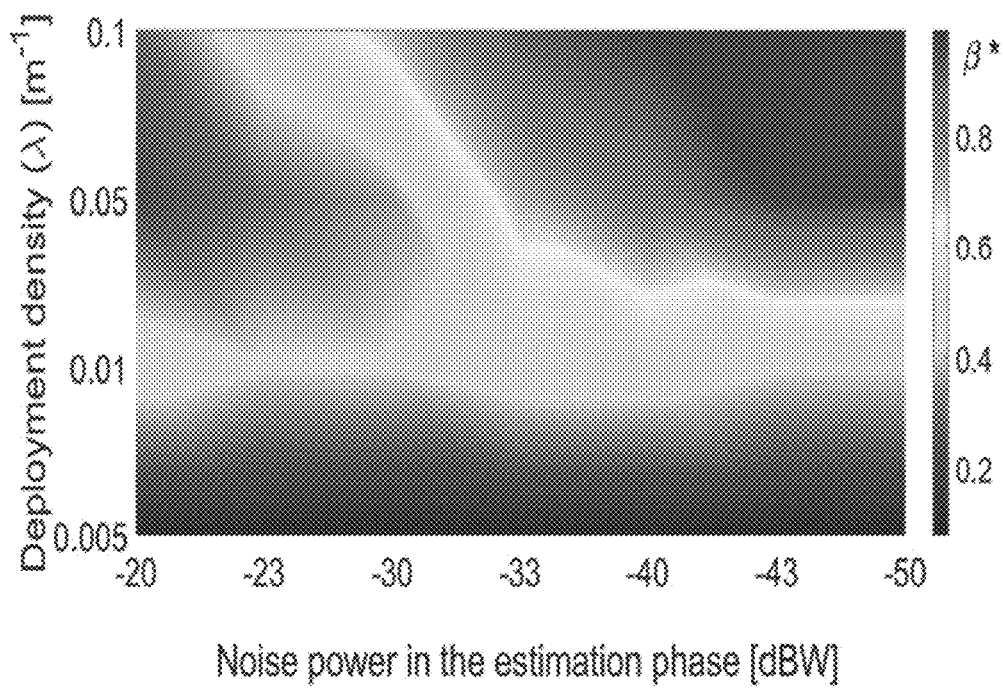
FIG. 9A represents the optimal value of the partitioning factor for different values of the deployment density and different noise levels.

FIG. 9A represents the optimal value of the partitioning factor for different values of the deployment density and different noise levels affecting the quality of the localization estimates at the UE.

In the present instance, the optimal value is obtained by giving priority to data communication for the allocation of transmission resources, according to FIG. 5.

The noise level directly impacts the accuracy of the estimation of the location and the AoA: the higher the noise level, the higher the standard deviations $\sigma_d$ and $\sigma_\psi$.

It appears from the figure that the optimal partitioning factor is close to 1 for high deployment densities and low noise levels. This is due to the fact that at low noise levels and for densely deployed BSs, even a limited amount of transmission resources allocated to localization results in accurate location and beam alignment. Thus, the optimal solution is to allocate most of the transmission resources to data communication. Conversely, for sparsely deployed BSs, that is for low values of deployment density $\lambda$, larger amount of transmission resources are required to obtain accurate location and beam alignment, even at low noise levels, thereby resulting in lower values of the optimal partitioning factor.

By contrast, the variation of the optimal partitioning factor is not monotonous at high noise levels. It is noted indeed that at high noise levels (e.g. at −20 dBW), the optimal partitioning factor increases at first with the deployment density and then decreases at higher deployment densities. This is due to the fact that, for dense deployment of BSs, in a context of high noise level, the effect of a beam selection error is more important because of the high level of interference induced by the neighbouring BSs. Hence, a lower value of $\beta^{com*}$ is needed for allocating more resources to localization.

Figure 9B:
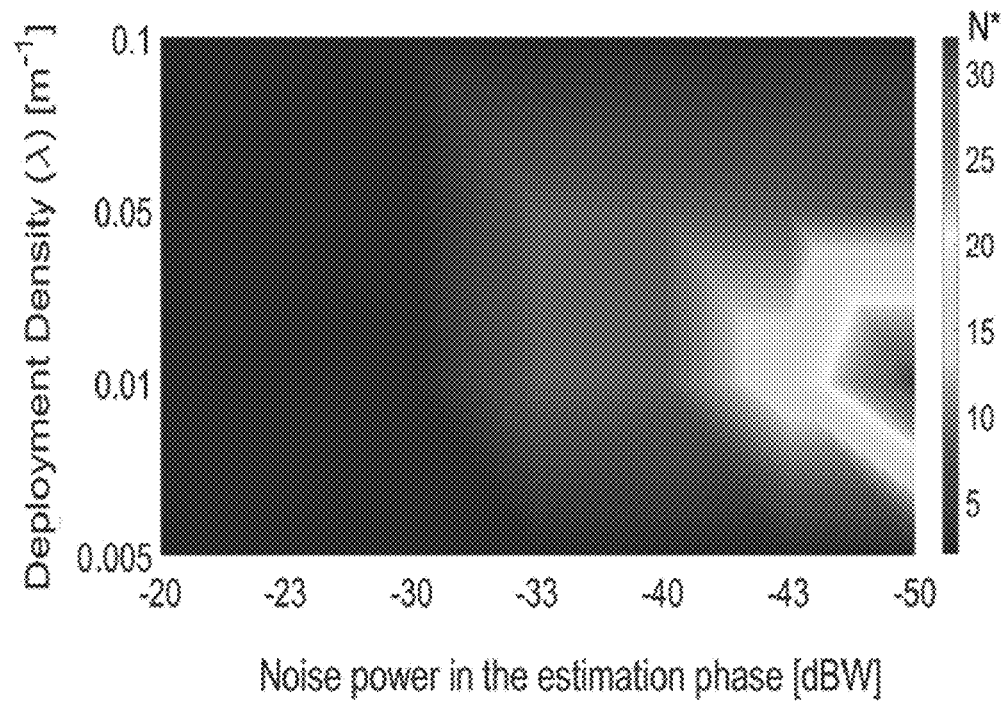
FIG. 9B represents the optimal dictionary size for different values of the deployment density and different noise levels.

FIG. 9B represents the optimal dictionary size for different deployment densities and different noise levels.

Here again, the optimal value is obtained by giving priority to data communication for the allocation of transmission resources, as in FIG. 5.

It can be seen from the left part of the figure that, at high noise levels, large beams have to be used in order to avoid beam selection errors, resulting in a small optimal size, N*, of the beam dictionary.

By contrast, at low noise levels, the optimal size of the beam dictionary does not vary monotonously anymore with the deployment density, see right part of the figure: at low densities, it increases with the deployment density, because larger antenna gains improve the rate coverage, and then decreases at high densities (beyond a deployment density threshold, $\lambda_{th}$) because beam selection errors seriously increase the interference due to the neighbouring BSs.

The invention claimed is:

1. A method of joint beam selection and partitioning of transmission resources for a downlink between a base station (BS) and a user equipment (UE) in a cellular network, the transmission resources being partitioned with a partitioning factor, β between a data communication service, in which data are transmitted on the downlink, and a localization service, wherein the UE is localized, the BS comprising a memory in which are stored a plurality of beam dictionaries, $BD_k$, k=1, ..., N each dictionary $BD_k$ being associated with a given beamwidth $\theta_k$ and defining a set of beams having the same beamwidth and different orientations, wherein
  (a) the BS is provided with an estimate ($\hat{d}$) of the position of the UE along with a standard deviation ($\sigma_d$) of said estimate;
  (b) the BS is provided with an estimate of the angle of arrival ($\hat{\psi}$) of the signal at the UE along with a standard deviation ($\sigma_\psi$) of said estimate;
  (c) for each beam dictionary, $BD_k$, k=1, ..., N and a BS beam of this dictionary having a coverage area including the UE, it is determined a partitioning factor, $\beta_k^*$, which maximizes a communication performance indicator $f_{com}(k,\beta)$ while meeting a predetermined constraint of a localization performance indicator;
  (d) the beam dictionary, $f_{com}(k,\beta_k^*)$, corresponding to the highest value of the communication performance indicators $f_{com}(k,\beta_k^*)$, k=1, ..., N is selected the optimal partitioning factor ($\beta^{com*}$) corresponding to said highest value being used for partitioning said transmission resources and the BS using for data communication the beam in the selected beam dictionary, $BD_{k^*}$, having a coverage area including the UE;
  (e) the optimal partitioning factor is sent by the BS to the UE.

2. The method of joint beam selection and partitioning of transmission resources for a downlink between a base station and a user equipment in a cellular network according to claim 1, wherein the optimal beamwidth ($\theta^{com*},\theta^{loc*}$) corresponding to the selected beam dictionary, $BD_{k^*}$, is sent to the UE, along with the optimal partitioning dictionary ($\beta^{com*}\beta^{loc*}$).

3. The method of joint beam selection and partitioning of transmission resources for a downlink between a base station and a user equipment in a cellular network according to claim 1, wherein the communication performance indicator is an effective throughput of the UE defined as the downlink data rate between the BS and the UE weighted by the probability of outage of the downlink with respect to a predetermined threshold of signal to noise and interference ratio.

4. The method of joint beam selection and partitioning of transmission resources for a downlink between a base station and a user equipment in a cellular network according to claim 1, wherein the communication performance indicator is an average effective throughput, the effective throughput of a user equipment being defined as a downlink data rate between the BS and said user equipment, the downlink data rate being weighted by the probability of outage of the downlink with respect to a predetermined threshold of signal to noise and interference ratio, the average being calculated over a plurality of user equipments simultaneously served by the BS.

5. The method of joint beam selection and partitioning of transmission resources for a downlink between a base station and a user equipment in a cellular network according to claim 1, wherein the communication performance indicator is a proportional fairness indicator calculated as an average of the logarithms of effective throughputs, the effective throughput of a user equipment being defined as a downlink data rate between the BS and said user equipment, the downlink data rate being weighted by the probability of outage of the downlink with respect to a predetermined threshold of signal to noise and interference ratio, the average of the logarithms of effective throughputs being calculated over the user equipments simultaneously served by the BS.

6. The method of joint beam selection and partitioning of transmission resources for a downlink between a base station and a user equipment in a cellular network according to claim 1, wherein the communication performance indicator is an effective rate coverage probability, defined as the probability that the downlink data rate of the UE is greater than a predetermined threshold.

7. The method of joint beam selection and partitioning of transmission resources for a downlink between a base station and a user equipment in a cellular network according to claim 1, wherein the communication performance indicator is an average effective rate coverage probability, the effective rate coverage probability of a user equipment being defined as the probability that the downlink data rate of said user equipment is greater than a predetermined threshold, the average being taken over the user equipments simultaneously served by the BS.

8. The method of joint beam selection and partitioning of transmission resources for a downlink between a base station and a user equipment in a cellular network according to claim 1, wherein the transmission resources are time intervals in a frame structure, a number of carriers in a frequency band, or a number of pilots in a time-frequency multiplexed scheme.

9. The method of joint beam selection and partitioning of transmission resources for a downlink between a base station and a user equipment in a cellular network according to claim 1, wherein the localization performance indicator is the inverse of the product of a probability of a beam selection error in the beam dictionary and of the probability of a misalignment between the selected BS beam and a receiving beam of the UE.

10. The method of joint beam selection and partitioning of transmission resources for a downlink between a base station and a user equipment in a cellular network according to claim 1, wherein, at steps (a) and (b), the BS sends downlink pilot signals, the UE acquires phase and amplitude information of the received downlink pilot signals and sends said information back to the BS, and the BS estimates from said information the range of the UE as well as the angle of arrival of the downlink signal at the UE side.

11. The method of joint beam selection and partitioning of transmission resources for a downlink between a base station and a user equipment in a cellular network according to claim 1, wherein, at steps (a) and (b), the BS sends downlink pilot signals, the UE acquires phase and amplitude information of the received downlink, estimates from said information, its range as well as the angle of arrival of the downlink signal, and sends back to the BS the range and angle of arrival thus estimated.

12. The method of joint beam selection and partitioning of transmission resources for a downlink between a base station and a user equipment in a cellular network according to claim 1, wherein the standard deviation of the position and/or the standard deviation of the angle of arrival are approximated by a Cramer-Rao bound or a Ziv-Zakai bound.

13. The method of joint beam selection and partitioning of transmission resources for a downlink between a base station and a user equipment in a cellular network according to claim 1, wherein the cellular network is a mm-wave cellular network.

14. The method of joint beam selection and partitioning of transmission resources for a downlink between a base station and a user equipment in a cellular network according to claim 13, wherein the mm-wave cellular network is the small cell layer of a 5G network.

15. Method A method of joint beam selection and partitioning of transmission resources for a downlink between a base station (BS) and a user equipment (UE) in a cellular network, the transmission resources being partitioned with a partitioning factor, $\beta$, between a data communication service, in which data are transmitted on the downlink, and a localization service, wherein the UE is localized, the BS comprising a memory in which are stored a plurality of beam dictionaries, $BD_k$, k=1, . . . , N, each dictionary $BD_k$ being associated with a given beamwidth $\theta_k$ and defining a set of beams having the same beamwidth and different orientations, wherein (a) the BS is provided with an estimate ($\hat{d}$) of the position of the UE along with a standard deviation ($\sigma_d$) of said estimate;

(b) the BS is provided with an estimate of the angle of arrival ($\hat{\psi}$) of the signal at the UE along with a standard deviation ($\sigma_\psi$) of said estimate;

(c) for each beam dictionary, $BD_k$, k=1, . . . , N and a selected BS beam within said dictionary having a coverage area including the UE, it is determined a partitioning factor, which maximizes a localization performance indicator $f_{loc}(k,\beta)$ while meeting a predetermined constraint of a communication performance indicator $f_{com}(k,\beta)$;

(d) the beam dictionary, f.sub.loc(k,.beta.*.sub.k), corresponding to the highest value of the localization performance indicators $f_{loc}(k,\beta_k^*)$, k=1, . . . , N is selected, the optimal partitioning factor ($\beta^{loc*}$) corresponding to said highest value then being used for partitioning said transmission resources and the BS using for data communication the beam in the selected beam dictionary, $BD_{k^*}$, having a coverage area including the UE;

(e) the optimal partitioning factor is sent by the BS to the UE.

* * * * *